United States Patent [19]

Domitrovic et al.

[11] 4,268,767
[45] May 19, 1981

[54] ELECTRICAL MACHINE WITH AN AXIAL-FLOW FAN

[75] Inventors: Josip Domitrovic, Birr; Urban Ulrich, Fislisbach, both of Switzerland

[73] Assignee: BBC Brown, Boveri & Co., Ltd., Baden, Switzerland

[21] Appl. No.: 42,617

[22] Filed: May 25, 1979

[30] Foreign Application Priority Data

Jun. 9, 1978 [CH] Switzerland ............ 6311/78

[51] Int. Cl.³ .................................. H02K 9/00
[52] U.S. Cl. ............................. 310/53; 310/62; 310/63; 310/65
[58] Field of Search ............ 310/62, 63, 58, 59, 310/53, 64, 65

[56] References Cited

U.S. PATENT DOCUMENTS

| | | | |
|---|---|---|---|
| 2,809,307 | 10/1957 | Muczenski | 310/63 |
| 3,089,970 | 5/1963 | Rhodes | 310/64 |
| 3,518,467 | 6/1970 | Wightman | 310/63 |
| 3,527,970 | 9/1970 | Wightman | 310/63 |
| 3,610,976 | 10/1971 | Wightman | 310/64 |
| 3,761,748 | 9/1973 | Baumann | 310/62 |
| 3,870,907 | 3/1975 | Hoffman | 310/64 |

*Primary Examiner*—R. Skudy
*Attorney, Agent, or Firm*—Burns, Doane, Swecker & Mathis

[57] ABSTRACT

An electrical machine with an axial-flow fan and a two-part ventilator encasing is disclosed. One part of the ventilator encasing is non-moveable with respect to the fan blade of the axial-flow fan. The second encasing part is moveable with respect to the fan blade, and can be moved from a first position in which the moveable encasing part is adjacent to the fan blade to a second position axially displaced from the first position. The axial movement of the moveable encasing part facilitates maintenance and disassembly work on the machine which require a significant clearance between the fan blade and the encasing. The moveable encasing part is moveably mounted on a bearing bracket associated with the shaft of the rotor of the machine. The shaft of the rotor is used to coaxially position the moveable encasing part with respect to the axial-flow fan and the axial-flow fan blade. Means are provided to lock the moveable encasing part in the first axial position, and to maintain the quality of a seal between the moveable and non-moveable encasing parts during machine operation.

12 Claims, 2 Drawing Figures

ELECTRICAL MACHINE WITH AN AXIAL-FLOW FAN

BACKGROUND AND SUMMARY OF THE INVENTION

This invention relates generally to rotating electrical machinery, and more particularly to a self-ventilated electrical machine with an axial-flow fan and a ventilator encasing associated with the fan.

In conventional electrical machines with axial-flow fans, the clearance between the fan blade and the encasing associated with the fan are kept as small as possible in order to avoid pressure losses. Generally, the clearance is approximately 0.5 mm. However, maintenance and disassembly work in which the rotor of the machine has to be lifted, such as maintenance work involving the bearings, require substantially more clearance for motion between the fan and the encasing. As a result, maintenance and disassembly work generally require extensive and time-consuming measures in order to disassemble the encasing or to regulate the position of the encasing with respect to the fan. Such measures often include breaking through the machine casing in order to reach the ventilator encasing.

It is therefore an object of this invention to provide an electrical machine with an axial-flow fan and a ventilator encasing which facilitates maintenance and disassembly work.

According to a preferred embodiment of the present invention, the encasing includes two encasing parts, one of which is axially moveable with respect to the axial-flow fan blade. The axially moveable encasing part can be moved away from the fan blade to facilitate maintenance and disassembly work. The non-moveable encasing part is fixedly connectly to the machine casing or to stator sheet-metal plates of the machine. The moveable encasing part is moveably mounted on a bearing bracket associated with the rotor shaft of the machine and with the machine casing, and can be removed together with the bearing bracket from the machine. The moveable encasing part is so mounted on the bearing bracket that the moveable encasing part can be moved away from the fan blade even when the bearing bracket is fixedly connected to the machine casing.

BRIEF DESCRIPTION OF THE DRAWINGS

The preferred embodiments of the invention are described with reference to the accompanying drawings wherein like members bear like reference numerals and wherein.

DETAILED DESCRIPTION OF THE PREFERRED EMBODIMENTS

Figure 1:
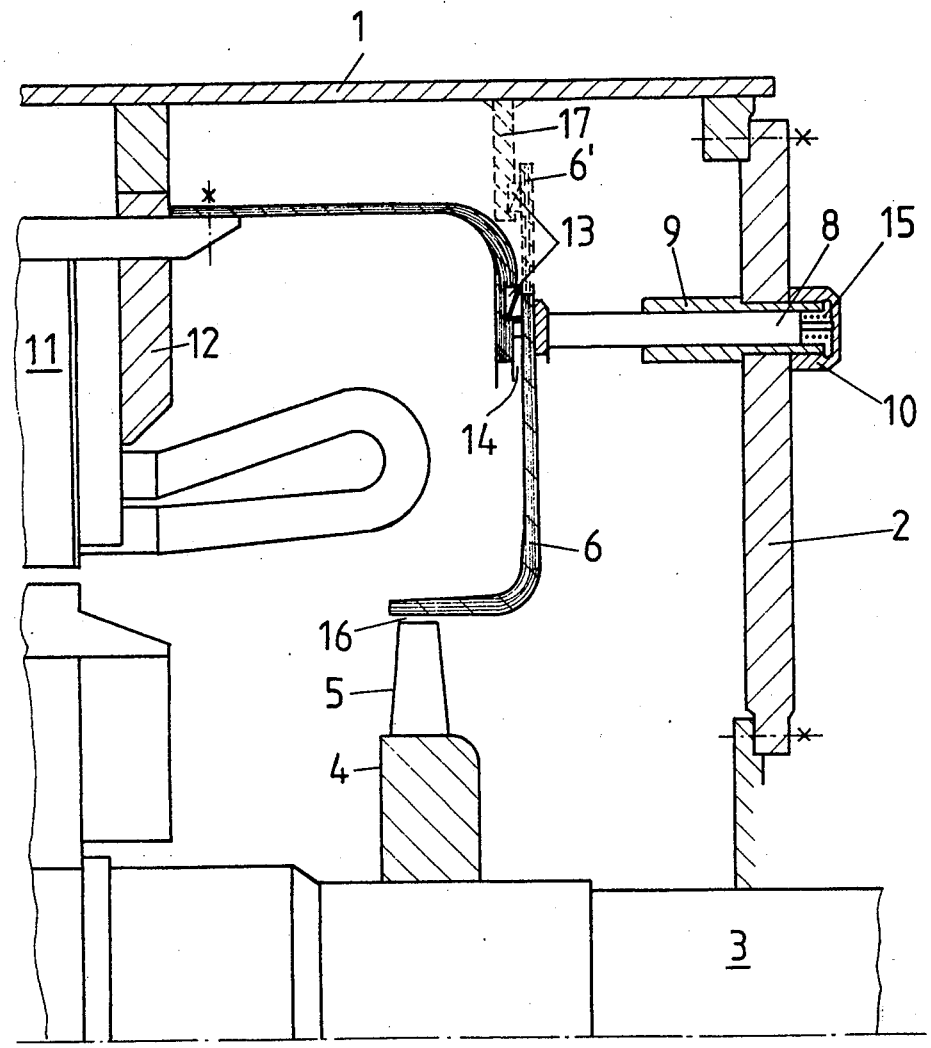
FIG. 1 is a cross-sectional view of an electrical machine according to the present invention illustrating an axially moveable encasing part in a first axial position.

Referring to FIG. 1, an electrical machine with an axial-flow fan includes a machine casing 1 closed at a front end by a bearing bracket 2. The bearing bracket is associated with a shaft 3 of the rotor of the machine.

An axial-flow fan 4 is arranged on the shaft 3 and includes a fan blade 5. A ventilator encasing which is associated with the axial-flow fan includes a first encasing part 6 and a second encasing part 7. Both encasing parts are made of an insulating material. The encasing part 6 is illustrated in a first axial position in which the encasing part 6 is adjacent to the axial-flow fan blade 5. A clearance 16 exists between the encasing part 6 and the fan blade 5. The encasing part 6 is annular in geometry and has an L-profile in the radial direction illustrated in FIG. 1.

The bearing bracket 2 includes a plurality of sockets 9. The sockets are preferrably screwed into the bearing bracket from the inside of the machine and project to the outside of the machine. Each socket accommodates a bolt 8. The bolts 8 are fixedly connected to the encasing part 6, and the bolts 8 and the encasing part 6 are moveable as a unit in the axial direction.

A cap nut 10, which is screwed onto the threaded part of the socket which projects through the bearing bracket, urges the bolt 8 and the encasing part 6 against the encasing part 7.

The encasing part 7 is fixedly connected to either a stack of sheets 11 or to a stator pressure plate 12, collectively referred to herein as the stator sheet-metal plates.

An annular gasket element 13 is included on the second encasing part 7 for the mutual sealing of both encasing parts. In order to provide an approximately constant gasket sealing effect under all operating conditions of the machine, the bolt 8 is biased by an appropriately dimensioned spring 15 located between the bolt 8 and the cap nut 10. A spacing piece 14 is included on the encasing part 6 in order to provide a minimum spacing between encasing parts 6 and 7 so as to limit the load which can be imposed upon the gasket 13.

Figure 2:
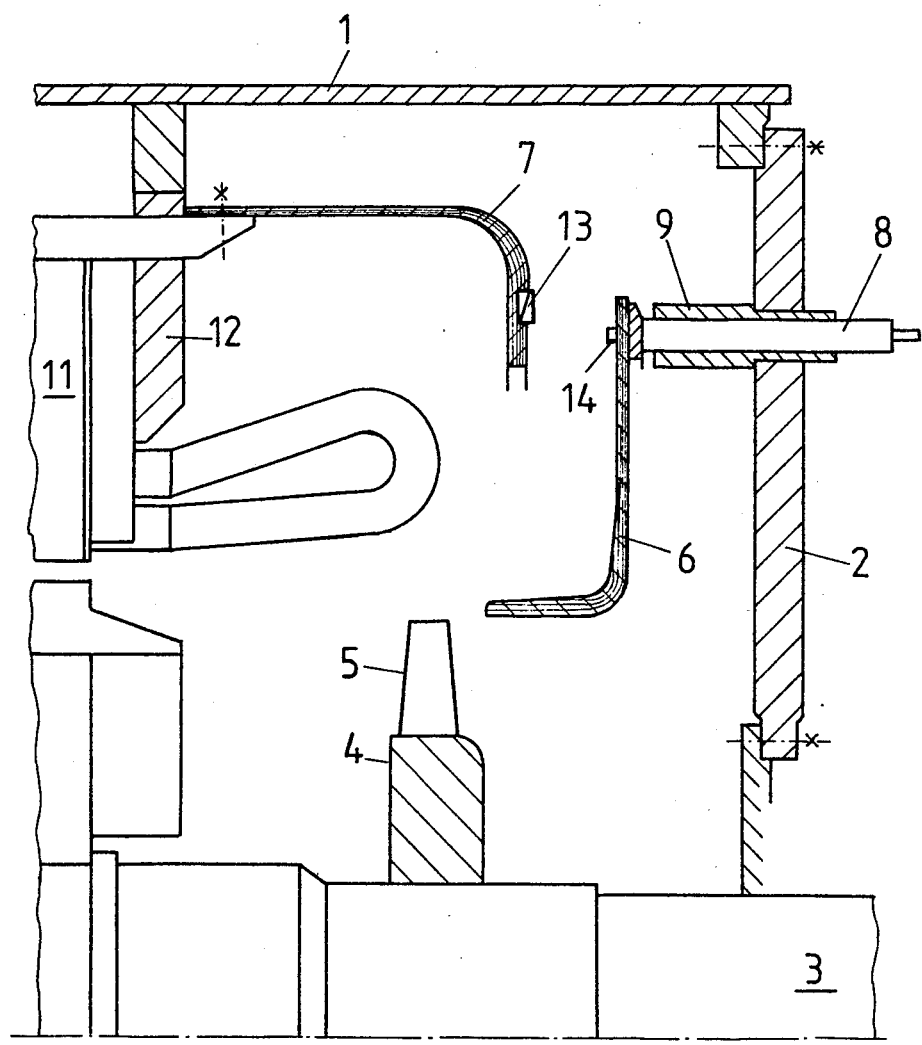
FIG. 2 is a cross-sectional view of the electrical machine of FIG. 1 illustrating the moveable encasing part in a second axial position.

With the cap nuts 10 removed, the bolts 8 can be moved axially through the sockets 9 so as to move the encasing part 6 from a first axial position illustrated in FIG. 1 to a second axial position illustrated in FIG. 2.

Referring to FIG. 2, the encasing part 6 is illustrated in the second axial position in which the encasing part 6 has been drawn toward the bearing bracket 2 and axially away from the axial-flow fan blade 5. With the encasing part 6 so positioned, the rotor can be handled without consideration of the narrow clearance required between the fan blade and the encasing part in order to avoid pressure losses during machine operation.

The moveable encasing part 6 is held and centered with respect to the rotor shaft by the axially running bolts 8 which pass preferentially into the sockets 9 arranged on the bearing bracket 2. The bearing bracket 2 is fixedly connected to the machine casing 1. The encasing part 6 can be removed with the bearing bracket 2 from the machine. This arrangement also allows the encasing part 6 to be moved axially even when the bearing bracket is fixedly connected to the machine casing.

Additionally, this arrangement utilizes the shaft of the rotor to coaxially position the encasing part 6 with respect to the axial-flow fan 4 and the axial-flow fan blade 5.

Referring to FIG. 1, an alternate embodiment of the present invention is illustrated through the use of dotted lines. In the alternate embodiment the non-moveable encasing part includes an annular flange 17 which is included on the machine casing 1. The moveable encasing part 6 includes an extention 6' which extends over the annular flange 17. The annular gasket element 13 is included on the annular flange 17 and provides a seal between the annular flange 17 and the extension 6' of the encasing part 6 when the encasing part 6 is in the first axial position.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An electrical machine having an axial-flow fan mounted on a rotor shaft within a machine casing comprising:
   an axial-flow fan blade included on the axial-flow fan;
   a bearing bracket associated with the rotor shaft and fixedly connected to the machine casing;
   a first encasing part for the axial-flow fan, said first encasing part being axially moveable relative to said fan blade from a first axial position adjacent to said fan blade to a second axial position axially spaced from said fan blade, and said first encasing part being moveably mounted on said bearing bracket;
   a second encasing part for the axial-flow fan, said second encasing part being fixedly connected to said machine casing;
   means for sealing said first encasing part to said second encasing part when said first encasing part is in said first axial position; and
   means for axially moving said first encasing part from said first axial position to said second axial position.

2. An electrical machine having an axial-flow fan mounted on a rotor shaft within a machine casing comprising:
   an axial-flow fan blade included on the axial-flow fan;
   a multiple-part ventilator encasing for the axial-flow fan, including:
      a first encasing part axially movable relative to said fan blade from a first axial position adjacent to said fan blade to a second axial position axially spaced from said fan blade; and
      a second encasing part fixedly connected to the machine casing; and
   means for axially moving said first encasing part from said first axial position to said second axial position.

3. An electrical machine having an axial-flow fan mounted on a rotor shaft within a machine casing comprising:
   an axial-flow fan blade included on the axial-flow fan;
   a plurality of stator sheet-metal plates fixedly connected to the machine casing;
   a multiple-part ventilator encasing for the axial-flow fan, including:
      a first encasing part axially movable relative to said fan blade from a first axial position adjacent to said fan blade to a second axial position axially spaced from said fan blade; and
      a second encasing part fixedly connected to said stator sheet-metal plates; and
   means for axially moving said first encasing part from said first axial position to said second axial position.

4. An electrical machine having an axial-flow fan mounted on a rotor shaft within a machine casing comprising:
   an axial-flow fan blade included on the axial-flow fan;
   a multiple-part ventilator encasing for the axial-flow fan, including:
      a first encasing part axially movable relative to said fan blade from a first axial position adjacent to said fan blade to a second axial position axially spaced from said fan blade; and
      a second encasing part integral with the machine casing; and
   means for axially moving said first encasing part from said first axial position to said second axial position.

5. An electrical machine according to claim 1, 3 or 4 further comprising means for sealing the first encasing part to the second encasing part when said first encasing part is in the first axial position.

6. An electrical machine according to claim 5 wherein said sealing means comprises:
   an annular gasket element included between said first and second encasing parts when said first encasing part is in the first axial position; and
   biasing means for urging said first encasing part against said gasket element and said second encasing part.

7. An electrical machine according to claim 1, 3 or 4 further comprising a bearing bracket associated with the rotor shaft and fixedly connected to the machine casing.

8. An electrical machine according to claim 7 wherein the first encasing part is moveably mounted on the bearing bracket.

9. An electrical machine according to claim 7 wherein the means for axially moving the first encasing part is included on said bearing bracket.

10. An electrical machine according to claim 7 wherein the means for axially moving the first encasing part comprises:
    a plurality of sockets included on said bearing bracket; and
    a plurality of axially running bolts, said plurality of bolts being centered with respect to the axial-flow fan, and said bolts being fixedly connected to said first encasing part, and each of said bolts passing through one of said sockets.

11. An electrical machine according to claim 10 further comprising means for locking the first encasing part in the first axial position.

12. An electrical machine according to claim 11 further comprising means for urging the first encasing part to the first axial position.

* * * * *